Aug. 10, 1943.  E. A. ZETTERQUIST  2,326,112
TURBINE APPARATUS
Filed Nov. 11, 1941
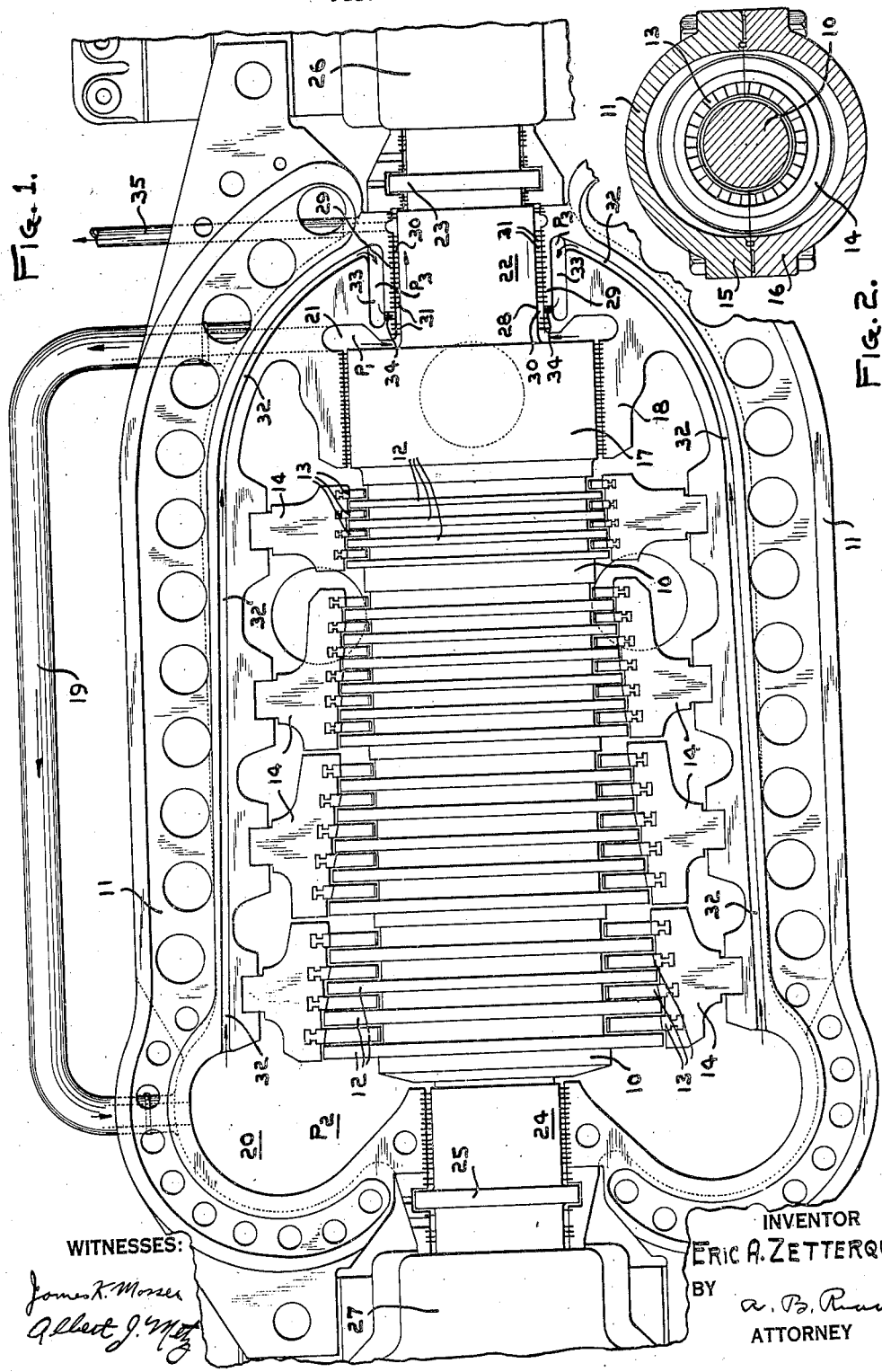
INVENTOR
Eric A. Zetterquist.
BY
ATTORNEY
WITNESSES:

Patented Aug. 10, 1943

2,326,112

UNITED STATES PATENT OFFICE 2,326,112

TURBINE APPARATUS

Eric A. Zetterquist, Drexel Hill, Pa., assignor to Westinghouse Electric & Manufacturing Company, East Pittsburgh, Pa., a corporation of Pennsylvania Application November 11, 1941, Serial No. 418,634

2 Claims. (Cl. 253—69)

The invention relates to elastic fluid turbines and it has for an object to provide improved means assuring of operation of the high-pressure end, particularly the gland portion thereof, without excessive leakage loss and without the attainment of excessively high temperatures.

In conventional designs of large superimposed turbines, or high-pressure sections of compound turbines, the steam at the inlet to the reaction blading is but slightly expanded at full load, and sometimes not expanded at all, where by-passing is employed. This latter condition also exists if the straight reaction principle is employed. Consequently, the portion of the steam which is wire drawn through the dummy and the high-pressure end gland labyrinth is considerably hotter than that discharging from the low pressure or coupling end gland. The difference in temperature may reach a value of the order of 350° to 400° F. While the leakage through the high-pressure end gland may be somewhat smaller than that through the low-pressure end gland, because of the higher specific volume of the hotter steam, nevertheless, on account of the higher enthalpy of steam leaking past the high-pressure end gland, the evaluated leakage loss of the latter is greater.

A more particular object of the invention, therefore, is to satisfy the leakage requirements of the high-pressure end gland by steam which has done work in the turbine with the result that the leakage loss is reduced.

Aside from this way of satisfying the requirements of the high-pressure end gland for leakage steam being thermally better, other desirable results are accomplished. The relatively cooler steam will reduce the intense heat around the high-pressure end gland and will minimize the amount of water circulated through the water gland and the amount of oil through the high-pressure end bearing, it being otherwise necessary to circulate large amounts of water and oil for cooling purposes. A further advantage is that by preventing the attainment of excessive temperatures in the bearing, normal bearing clearances may be preserved, this being desirable to prevent spindle or shaft jumps or movements causing instability of the governor because of changes in pressure due to variations in oil leakage.

Therefore, a further object of the invention is to satisfy the leakage requirements of the high-pressure end gland by means of steam which has done work in the turbine, the steam being so applied and supplied to the high-pressure end gland as to exert a cooling effect with the result that the high-pressure end gland operates at a minimum temperature, heat transmitted to the water gland and the bearing is minimized, and, on the latter account, normal bearing clearances are preserved.

These and other objects are effected by the invention as will be apparent from the following description and claims taken in connection with the accompanying drawing, forming a part of this application, in which:

Fig. 1 is a plan view of a turbine with the cover removed; and

Fig. 2 is a transverse sectional view of the turbine.

In the drawing there is shown a turbine including a rotor 10 and a cylinder 11. The rotor is provided with moving blading 12 with which cooperates stationary blading 13 supported by the cylinder, preferably by means of blade rings 14. As is customary, the cylinder includes upper and lower halves having flange portions 15 and 16 connected to form a joint.

As is customary with reaction turbines, the rotor 10 has a dummy piston 17 at its high-pressure end and the piston is encompassed by a dummy ring 18 carried by the cylinder. An equilibrium pipe 19 connects the exhaust space 20 with the space 21 at the exhaust or discharge end of the dummy.

Also, the turbine is provided with the usual glands and bearings, that is, with a high-pressure end labyrinth steam gland, at 22, and a water gland 23, a low-pressure end labyrinth gland, at 24, and a water gland 25, and high and low pressure end bearings 26 and 27.

The steam gland, at 22, comprises a rotor portion 28 and a ring portion 29 carried by the cylinder and encompassing the rotor portion to define the annular space 30 within which are disposed the labyrinth sealing strips 31 preferably carried by the ring portion.

A passage 32 connects the exhaust space 20 with the labyrinth space 30 near to the end of the latter adjacent to the dummy construction so that the steam requirements of the gland may be largely satisfied by steam supplied from the exhaust space. The passage 32 may be provided in any suitable way, and, by way of example, one or more leakage grooves of suitable flow area are shown for this purpose.

In order that steam supplied to the gland from the exhaust space 20 may exert a substantial cooling effect on the structure of the gland, thereby minimizing the transmission of heat to the water gland and the bearing disposed outwardly thereof, the gland ring portion 29 is formed with an annular chamber 33 which extends axially for a substantial portion of the axial extent of the ring portion and an annular slot 34 connects the chamber 33 to the labyringth space 30 near to the end of the latter adjacent to the dummy construcuton. As the steam supplied to the chamber 33 is at a substantially lower temperature than the steam exhausting from the dummy construction, it will exert a substantial cooling effect on the structure of the steam gland and minimize the transmission of heat to the water gland and the turbine bearing disposed outwardly of the latter, whereby the cooling requirements of the water gland and of the bearing are reduced and less water and oil are required to be circulated through the latter.

Assuming that the pressure in the space 21, that is, at the inlet end of the steam gland, at 22, is $p_1$ and that the pressure in the exhaust space 20 is $p_2$, then the pressure $p_1$ will be higher than the pressure $p_2$ by the amount of pressure drop over the equilibrium pipe 19. By having the passageway means 32 of sufficient flow area, flow of steam may take place from the exhaust chamber 20 and through the labyrinth gland, at 22, to the leak-off 35 connected to any suitable apparatus, for example, to a deaerator (not shown).

Assuming that the pressure in the chamber 33 is $p_3$, then the pressure difference $p_1-p_3$ will be very small or approximately twice the pressure drop over the equilibrium pipe and will allow but a negligible amount of high-pressure steam to flow past the few labyrinth sealing strips between the chamber 21 and the annular slot 34, that is, for all practical purposes, the steam passing through the labyrinth space 30 is of the same quality and quantity as that passing through the labyrinth space of the gland, at 24.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a steam turbine, a cylinder; a rotor; cooperating blading carried by the cylinder and by the rotor; a dummy piston and ring construction at the high-pressure end of the turbine; a bearing at the high-pressure end of the turbine; a gland arrangement between the dummy construction and the bearing and including a steam gland; said steam gland comprising a rotor portion, a ring portion carried by the cylinder and cooperating with the rotor portion to define a gland sealing space of annular section, and labyrinth sealing means distributed along said sealing space for sealing the latter; said turbine having a first space between the dummy construction and the gland arrangement and a second or exhaust space; an equilibrium passage connecting said first and second spaces; and a passage for supplying steam from the second or exhaust space to a region of the gland sealing space near to the end of the latter opening into the first space with some of said labyrinth sealing means intervening between the region and said first space to assure of a gland pressure at the region lower than the pressure in said second or exhaust space in order that the gland leakage may be largely satisfied by steam supplied to the region from the second or exhaust space.

2. In a steam turbine, a cylinder; a rotor; cooperating blading carried by the cylinder and by the rotor; a dummy piston and ring construction at the high-pressure end of the turbine; a bearing at the high-pressure end of the turbine; a gland arrangement between the dummy construction and the bearing and including a steam gland; said steam gland comprising a rotor portion, a ring portion carried by the cylinder and cooperating with the rotor portion to define a gland sealing space of annular section, and labyrinth sealing means distributed along said sealing space for sealing the latter; said turbine having a first space between the dummy construction and the gland arrangement and a second or exhaust space; an equilibrium passage connecting said first and second spaces; an annular chamber formed in the steam gland ring portion and extending for substantially the full axial length of the latter; a passage for supplying steam from the exhaust space to the annular chamber; and a slot formed in the steam gland ring portion for connecting said chamber to the region of the gland sealing space near to the end of the latter opening into the first space with some of said labyrinth sealing means intervening between the region and said first space to assure of gland pressure at the region lower than the pressure in said second or exhaust space in order that the gland leakage may be largely satisfied by steam flowing from the second or exhaust space to the region.

ERIC A. ZETTERQUIST.